May 26, 1953  W. G. TAYLOR ET AL  2,639,741
SELF-PROPELLED WOODWORKING AND FINISHING MACHINE
Filed Sept. 29, 1950   3 Sheets-Sheet 1

INVENTORS
WILLIAM G. TAYLOR &
CLEO W. CAMPBELL
BY
Wm. H. Dean
AGENT

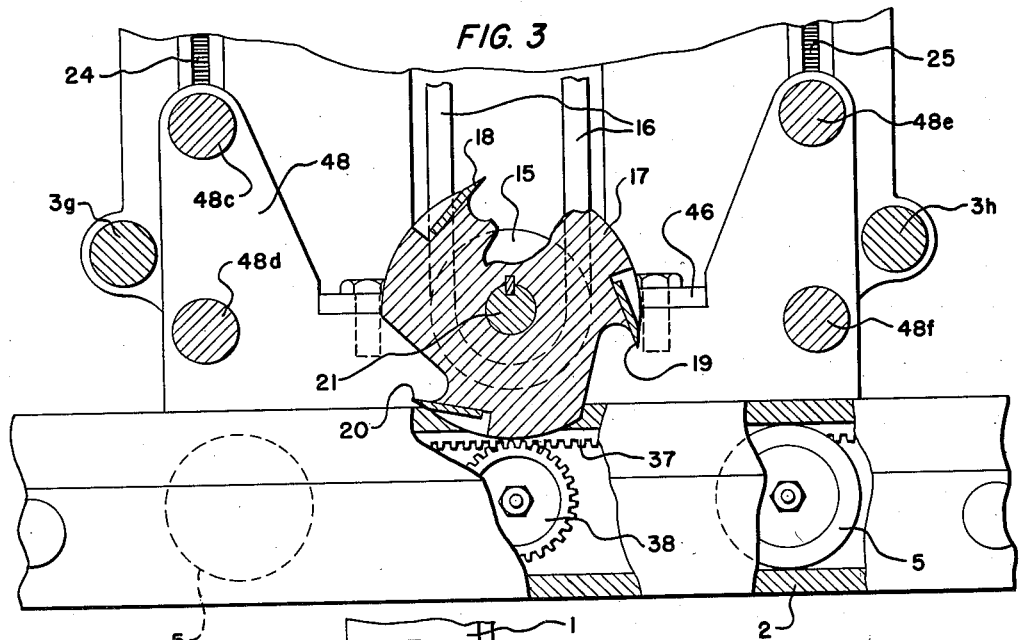
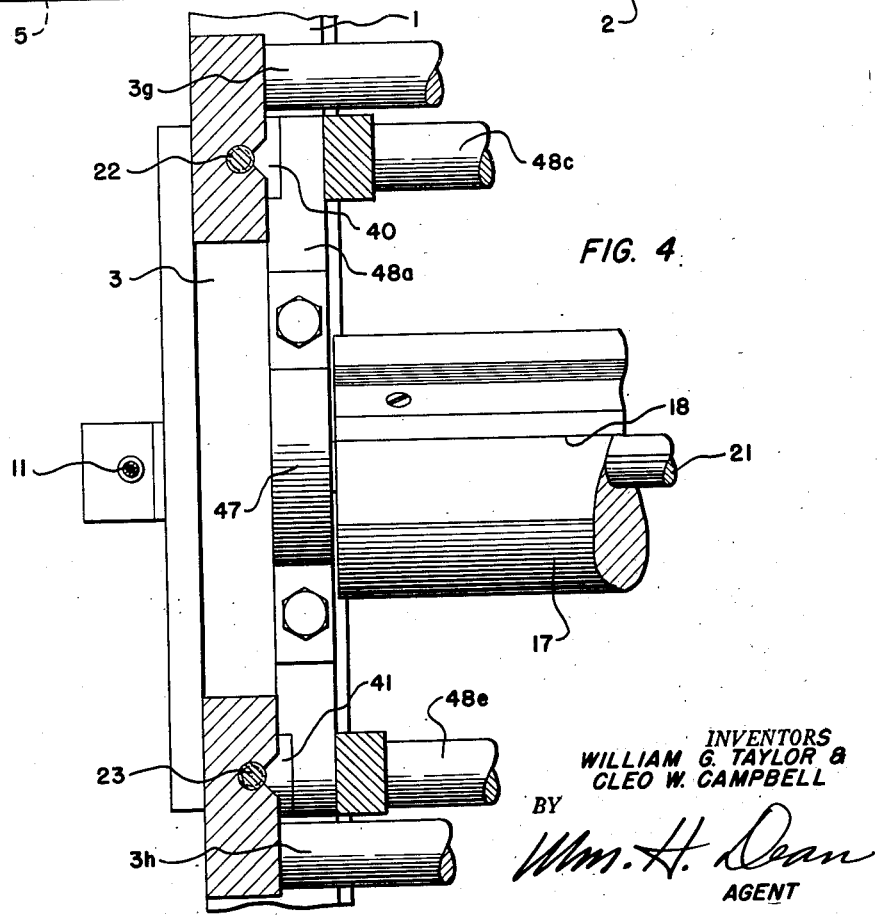

INVENTOR.
WILLIAM G. TAYLOR &
CLEO W. CAMPBELL
BY
Knox & Knox
AGENTS

Patented May 26, 1953

2,639,741

UNITED STATES PATENT OFFICE 2,639,741

SELF-PROPELLED WOODWORKING AND FINISHING MACHINE

William G. Taylor and Cleo W. Campbell, San Diego, Calif.

Application September 29, 1950, Serial No. 187,522

4 Claims. (Cl. 144—117)

1

Our invention relates to a self-propelled woodworking and finishing machine, and the objects of our invention are:

First, to provide a machine of this class having tracks which may be fixed to the work whereby the machine propels itself on said tracks over the surface of the work, providing a surface finish on the work which is smooth and true in accordance with said tracks;

Second, to provide a machine of this class which is particularly adapted for use in surfacing and refinishing the upper surfaces of shuffleboard tables or the like;

Third, to provide a machine of this class which saves considerable time and expense in the surfacing on shuffleboard table tops;

Fourth, to provide a machine of this class which is very simple to set up and operate;

Fifth, to provide a machine of this class in which the tracks thereof may be of any length desired for finishing table surfaces as long dimensionally as desired;

Sixth, to provide a machine of this class which may be used for a large variety of planing operations;

Seventh, to provide a machine of this class which may be used for planing, sanding or polishing the surfaces of various shuffleboard tables, or other work over which said machine may be operated; and Eighth, to provide a machine of this class which is very simple and economical of construction, efficient in operation, and which will not readily deteriorate or get out of order.

Figure 1:
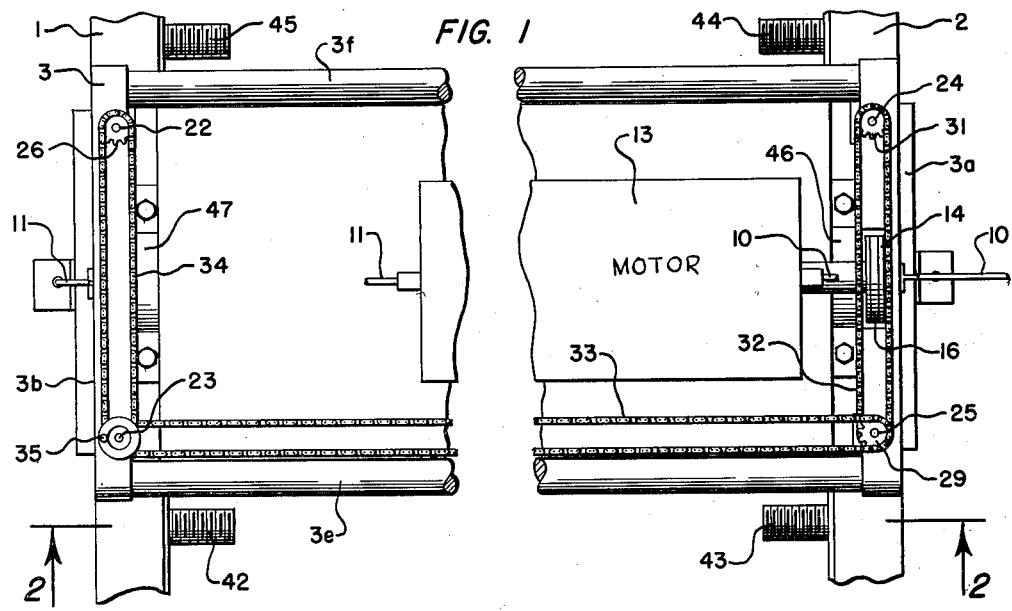
Figure 2:
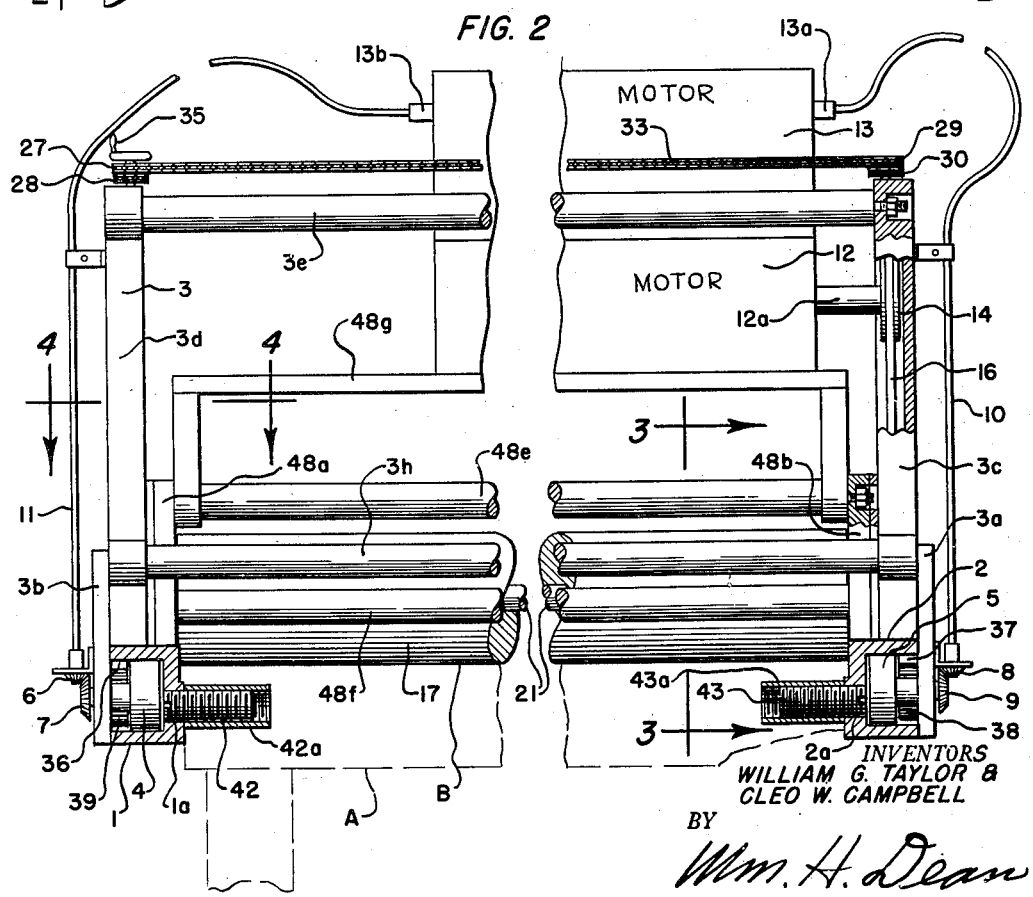
Figure 5:
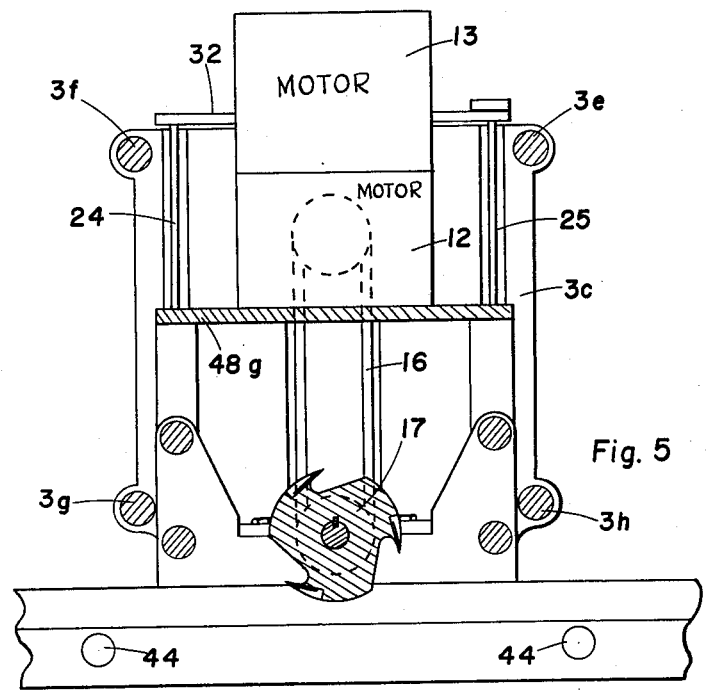
Figure 6:
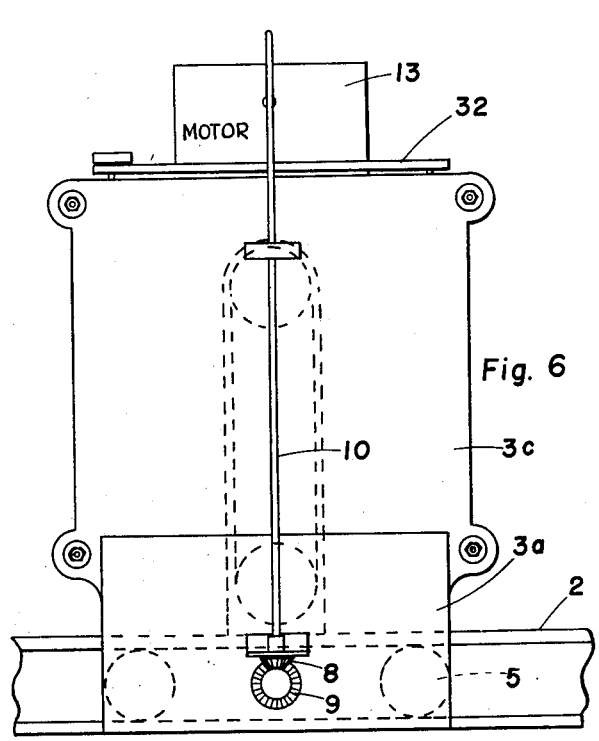
Figure 7:
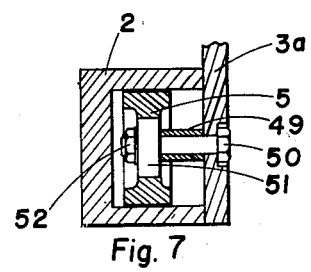
Figure 8:
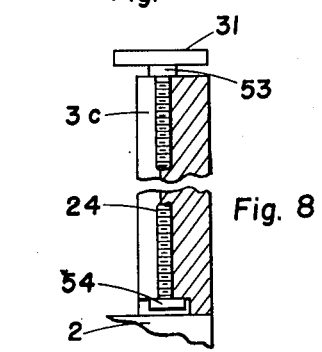

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a fragmentary top or plan view of our self-propelled woodworking and finishing machine, showing portions thereof broken away to facilitate the illustration; Fig. 2 is a fragmentary sectional view of our self-propelled woodworking and finishing machine, taken from the line 2—2 of Fig. 1, showing portions broken away to facilitate the illustration and amplify the same; Fig. 3 is a fragmentary sectional view on enlarged scale, taken from the line 3—3 of Fig. 2; and Fig. 4 is an enlarged fragmentary sectional view, taken from the line 4—4 of Fig. 2; Figure 5 is a cross-sectional view of the entire machine; Figure 6 is an end elevation as viewed from the right hand end of Figures 1 and 2; Figure 7 is a detailed showing of the means for attaching the rollers to the end plates; Figure 8 is a detailed showing of cutter bar screw adjusting means.

Similar characters of reference refer to similar parts and portions throughout the several views of the drawings.

The tracks 1 and 2, carriage frame 3, rollers 4 and 5, bevel gears 6, 7, 8 and 9, flexible shafts 10 and 11, motors 12 and 13, pulleys 14 and 15, belt 16, cutter bar 17, cutters 18, 19 and 20, shaft 21, screws 22, 23, 24 and 25, sprockets 26, 27, 28, 29, 30 and 31, chains 32, 33 and 34, crank handle 35, gear racks 36 and 37, spur gears 38 and 39, nuts 40 and 41, track-supporting screws 42, 43, 44 and 45, bearings 46 and 47, and the cutter frame 48, constitute the principal parts of our self-propelled woodworking and finishing machine.

The tracks 1 and 2 are substantially U-shaped in cross-section, as shown in Fig. 2 of the drawings, and are provided with openings 1a and 2a, through which the screws 42 and 43 project, which provide support for the tracks 1 and 2 at opposite edges of a shuffleboard table and to be coextensive with the table, as indicated by dash lines A in Fig. 2 of the drawings. The tracks are coextensive in a longitudinal, as well as transverse, direction. Within the table A at its opposite edges are installed bushings 42a and 43a, which are internally screw-threaded, engageable with the external screw-threads on the screws 42 and 43. These screws 42 and 43 tightly fit the openings 1a and 2a for precisely maintaining the tracks 1 and 2 in certain fixed relationship to the upper surface B of the shuffleboard table A.

Positioned within the tracks 1 and 2 are the gear racks 36 and 37, with which the spur gears 39 and 38, respectively, are meshed. The spur gears 38 and 39 are revolubly mounted on common shafts with the bevel gears 9 and 7, respectively, which shafts extend through the side plates 3a and 3b of the carriage frame 3, in which said shafts are revolubly mounted. These side plates 3a and 3b are fixed to the tracks 1 and 2 and to the upright frame ends 3c and 3d, which are interconnected by rods 3e, 3f, 3g and 3h.

It will be noted that the frame uprights 3c and 3d are positioned above the tracks 2 and 1, respectively, and support the screws 22, 23, 24 and 25 in longitudinal fixed relationship therewith, and in freely revoluble relationship therewith. These screws 22, 23, 24 and 25 are shouldered near opposite ends as best shown in Figure 8 to prevent longitudinal movement thereof in the uprights 3c and 3d of the carriage frame 3, and fixed to the cutter frame 48, at its opposite end plates 48a and 48b, are screw-threaded nuts engaging the screws 22 and 23, as shown best in Fig. 4 of the drawings. Mounted on the screw 22 is the sprocket 26, and mounted on the screw 23 are the sprockets 27 and 28. Mounted on the screw 25 are the sprockets 29 and 30, and mounted on the screw 24 is the sprocket 31. The chain 32 engages the sprockets 31 and 30, while the chain 33 engages the sprockets 29 and 27, and the chain 34 engages the sprockets 28 and 26.

The crank handle 35 is fixed on the screw 23, so that rotation thereof causes concurrent rotation of the screws 22, 23, 24 and 25, by means of the sprockets and chains hereinbefore described.

The end plates 48a and 48b of the cutter frame 48 are interconnected by bars 48c, 48d, 48e and 48f. Supported on the bars 48c and 48e is the motor frame 48g, carrying the motors 12 and 13 in superimposed relationship to each other. The shaft 21, carrying the cutter bar 17 fixed thereto, is removably journaled at opposite ends of the bearings 46 and 47 on the end plates 48b and 48a, respectively, and fixed to one end of the shaft 21 is the pulley 15, engaged by the belt 16, passing over the pulley 14 on the shaft 12a of the motor 12.

The motor 13 is provided with projecting shaft connections 13a and 13b on opposite ends thereof, to which the flexible shafts 10 and 11, respectively, are connected. These flexible shafts 10 and 11 are connected with the gears 8 and 6, respectively, in mesh with the gears 9 and 7, hereinbefore described.

The carriage frame 3 is supported by the rollers 4 and 5 in the tracks 1 and 2, as shown in Fig. 2 of the drawings, wherein these rollers 4 and 5, having ball bearings 51, are journaled on bolts 50 which pass through spacers 49 and are fastened by nuts 52. The bolts project from the side plates 3b and 3a, respectively, of said carriage frame 3, as shown in Figure 7.

The operation of our self-propelled woodworking and finishing machine is substantially as follows:

When the tracks 1 and 2 are fixed to the opposite edges of the shuffleboard table A by the screws 42 and 43, which engage bushings 42a and 43a in the shuffleboard, the tracks extend the entire length of the shuffleboard and extend approximately 6 inches past the shuffleboard proper at either end. The shuffleboard is approximately 3 inches thick and surrounded by a channel. This channel along the length of the board is about 3 in. wide and 3 in. deep. At either end of the shuffleboard the channel is about 8 inches wide and has a removable upwardly extending apron. The tracks are fitted within the side channels and extend over the end channels to allow the entire shuffleboard to be refinished and to provide adequate support for the machine. The machine after successive refinishing jobs can remove up to one inch of the original thickness of the shuffleboard. Figure 5 shows the machine with the cutter bar in its lowest position. The motors 12 and 13 are operated, which cause rotation of the shaft 21 and operation of the spur gears 38 and 39. Preliminary to the passage of the carriage frame 3 along the tracks 1 and 2, an adjustment of the cutter frame 48 relative to the carriage frame 3 is made by means of the crank handle 35 for vertically adjusting the cutter frame 48, as hereinbefore described. Thus, the depth of cut on the upper surface of the table A may be adjusted by adjusting the cutter bar 17, having the cutters 18, 19 and 20 in connection therewith, so that the desired cut is taken across the entire width of the upper surface of the table A during the passage of the carriage frame 3, together with the rollers 4 and 5, along the tracks 1 and 2 over the length of the table.

It will be here noted that when the tracks 1 and 2 are fixed to opposite edges of a shuffleboard table top, they are aligned in accordance with the connected relationship of said tracks 1 and 2 with the rollers 4 and 5, which are best shown in Fig. 3 of the drawings, wherein there is a pair of rollers 5 in the track 2, and a corresponding pair of spaced rollers 4 in the track 1. Thus, alignment parallel to each other is always maintained preliminary to the installation of the tracks 1 and 2 at opposite edges of the table top A.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. A self-propelled woodworking and finishing machine, comprising a pair of tracks adapted to be secured to opposite edges of the work, pairs of rollers on said tracks, a carriage frame supported by said rollers, gear racks in said tracks, gear means on said carriage frame engageable with said racks, means for propelling said gears, and a rotating horizontal cutter bar transversely arranged between said tracks and vertically adjustably mounted on said carriage frame relative to said work, screw means for vertically adjusting said cutter bar and means for rotating said bar.

2. A self-propelled woodworking and finishing machine, comprising a pair of tracks adapted to be secured to opposite edges of the work, pairs of rollers on said tracks, a carriage frame supported by said rollers, gear racks in said tracks, gear means on said carriage frame engageable with said racks, means for propelling said gears, and an axially horizontal rotating cutter bar adjustably mounted on said carriage frame relative to said work, and means for rotating said bar, screw means for vertically adjusting said carriage frame, a frame for said rotating bar, vertically adjustable relative to said carriage frame, and means for maintaining the same in adjusted position relative thereto, said rotating bar rotatable on a horizontal axis, and wood surfacing means on said bar for cutting the upper surface of the work.

3. In a self-propelled woodworking and finishing machine, a pair of tracks secured in spaced parallel relationship to a table top or the like, pairs of rollers engaging said tracks, a frame supported on said rollers, traction means in said tracks, and connected with said carriage frame for motivating said carriage frame along said tracks, and an axially horizontal rotatably mounted woodworking bar vertically adjustably supported on said carriage frame, engageable with the upper surface of the work intermediate said tracks and screw means on said carriage for vertically adjusting cutter bar.

4. In a self-propelled woodworking and finishing machine, a pair of tracks secured in spaced parallel relationship to a table top or the like, pairs of rollers engaging said tracks, a carriage frame supported on said rollers, traction means in said tracks connected with said carriage frame for motivating said carriage frame along said tracks, and an axially horizontal rotatably mounted woodworking cutter bar vertically adjustably supported on said carriage frame, engageable with the upper surface of the work intermediate said tracks, a cutter frame for said cutter bar and adjusting screws in said carriage frame adapted to vertically adjust said cutter frame, said adjusting screws having synchronizing chain and sprocket means for operating all of said adjusting screws concurrently.

WILLIAM G. TAYLOR.
CLEO W. CAMPBELL.

References Cited in the file of this patent

UNITED STATES PATENTS

| Number | Name | Date |
|---|---|---|
| 1,285,041 | Clark | Nov. 19, 1918 |
| 1,795,953 | Johnson | Mar. 10, 1931 |
| 2,288,782 | Brown | July 7, 1942 |
| 2,314,697 | Goff | Mar. 23, 1943 |
| 2,320,161 | Tolboys | May 25, 1943 |
| 2,342,267 | Goff | Feb. 22, 1944 |
| 2,454,992 | Coleman | Nov. 30, 1948 |